United States Patent
Sullivan

(10) Patent No.: US 9,373,967 B1
(45) Date of Patent: Jun. 21, 2016

(54) CHARGING STATION FOR MOBILE DEVICES AND ITS ASSOCIATED METHOD OF OPERATION

(71) Applicant: James J. Sullivan, Yardley, PA (US)

(72) Inventor: James J. Sullivan, Yardley, PA (US)

(*) Notice: Subject to any disclaimer, the term of this patent is extended or adjusted under 35 U.S.C. 154(b) by 253 days.

(21) Appl. No.: 14/256,046

(22) Filed: Apr. 18, 2014

(51) Int. Cl.
*H02J 7/00* (2006.01)
*H04N 7/18* (2006.01)
*G01R 31/02* (2006.01)

(52) U.S. Cl.
CPC .............. *H02J 7/0027* (2013.01); *G01R 31/026* (2013.01); *H04N 7/188* (2013.01)

(58) Field of Classification Search
CPC ..... H02J 7/0027; H02J 7/0021; H02J 7/0036; H02J 7/0031; G01R 31/026; H04N 7/188
See application file for complete search history.

(56) References Cited

U.S. PATENT DOCUMENTS

| | | | | |
|---|---|---|---|---|
| 5,111,299 A * | 5/1992 | Aoki | .................... | H04N 5/9208 348/333.02 |
| 8,259,221 B1 * | 9/2012 | Kaplan | ................. | H02J 7/0055 320/114 |
| 2003/0023874 A1 * | 1/2003 | Prokupets | ................ | G06F 21/32 726/4 |
| 2003/0218539 A1 * | 11/2003 | Hight | ................. | G08B 21/0244 340/539.13 |
| 2004/0264743 A1 * | 12/2004 | Arnouse | ............ | B64D 45/0015 382/116 |
| 2005/0068181 A1 * | 3/2005 | Wang | ................. | G07C 9/00103 340/572.1 |
| 2008/0255901 A1 * | 10/2008 | Carroll | ............... | G06Q 30/0237 705/14.37 |
| 2009/0174365 A1 * | 7/2009 | Lowenthal | .......... | B60L 11/1816 320/109 |
| 2010/0228405 A1 * | 9/2010 | Morgal | .................... | B62H 3/02 701/2 |
| 2012/0129577 A1 * | 5/2012 | Vaknin | ................... | H02J 7/0027 455/573 |
| 2012/0249054 A1 * | 10/2012 | King | ..................... | H02J 7/0003 320/107 |
| 2013/0132307 A1 * | 5/2013 | Phelps | .................. | H02J 7/0027 705/412 |
| 2013/0252577 A1 * | 9/2013 | Jordan | .................... | H04W 4/26 455/406 |
| 2014/0239883 A1 * | 8/2014 | Hobson | ................. | H02J 7/0027 320/107 |
| 2014/0253021 A1 * | 9/2014 | Luke | ..................... | H02J 7/0013 320/107 |
| 2014/0266047 A1 * | 9/2014 | Robers | ................ | B60L 11/1846 320/109 |
| 2014/0267712 A1 * | 9/2014 | Foerster | ............. | G08B 13/1445 348/143 |
| 2014/0285318 A1 * | 9/2014 | Audeon | ............ | G07C 9/00111 340/5.61 |
| 2015/0042287 A1 * | 2/2015 | Liu | ....................... | B60L 11/182 320/134 |

* cited by examiner

*Primary Examiner* — Jay Patel
*Assistant Examiner* — Joseph Suh
(74) *Attorney, Agent, or Firm* — LaMorte & Associates P.C.

(57) ABSTRACT

A system and method for storing, charging and monitoring one or more handheld electronic devices. A cabinet structure is provided that defines compartments. The cabinet structure supports a power supply, a controller, an interface, a camera, and alarms. Cables lead from each of the compartments to the power supply. The cables are terminated in the compartments with a variety of connector heads. The system is operated by a user utilizing an interface and a systems controller. When a user places a handheld electronic device in a compartment and connects that device to the appropriate connector head, a power connection is made. Furthermore, the controller assigns a unique access code to that connection. Should a person undue the connection without first entering the proper access code into said interface, then the camera and alarms are activated.

14 Claims, 4 Drawing Sheets

CHARGING STATION FOR MOBILE DEVICES AND ITS ASSOCIATED METHOD OF OPERATION

BACKGROUND OF THE INVENTION

1. Field of the Invention

In general, the present invention relates to charging stations that enable mobile devices, such as mobile phones and tablet computers, to be recharged. More particularly, the present invention relates to charging stations that are intended to be used by the public, and therefore contain security measures that inhibit theft of the charging mobile device.

2. Prior Art Description

In most of the industrialized countries of the world, it is commonplace for a person to carry at least one mobile electronic device, such as a cell phone or a tablet computer. However, such devices can rarely hold a charge for more than a few days, and often less than one day if used continuously. Accordingly, mobile electronic devices require frequent recharging in order to continue operating.

It is not unusual for a user to forget to charge his/her mobile electronic device before leaving home. It is also not unusual for a user not to carry the recharging equipment required to recharge the mobile electronic device outside of the user's residence. As a result, people often find themselves with phones, computer tablets, and other mobile electronic devices that have depleted batteries and require recharging.

As mobile electronic devices become more sophisticated, they become more integral to a person's day-to-day routine. Smart phones and computer tablets are used as appointment calendars, cameras, and portals to wireless data networks. Consequently, if a person has a mobile electronic device with a depleted battery, that user can be greatly inconvenienced and may even be incapable of performing work. It is because of these needs that public charging stations have been developed. Public charging stations provide a point in a public area, such as coffee shop or an office building, where a person can recharge his/her mobile electronic device.

Prior art public charging stations typically contain individual compartments where a phone or tablet computer can be locked away. Within the compartment, the mobile electronic device is connected to a power source for recharging. Such prior art recharging stations are exemplified by U.S. Patent Application Publication No. 2013/0252577 to Jordan, U.S. Patent Application Publication No. 2012/0129577 to Vaknin, and U.S. Patent Application Publication No. 2013/0132307 to Phelps.

Such prior art public charging stations have certain inherent disadvantages. First, public recharging stations that retain mobile electronic devices in a locked compartment, greatly limit access to that device. If a phone rings with an incoming call, it may not be possible to access the phone in time to answer the call. Furthermore, the ring tone that accompanies an incoming call may not be audible outside of the locked compartment. Second, public recharging stations that have locked compartments typically require that users pay for the privilege of placing a mobile electronic device into one of the compartments. Consequently, the recharging station must be connected to a phone line or wireless communication network, so it can receive and process credit card information. This provides the recharging station with a significant monthly operating cost to the location that hosts the recharging station. These disadvantages make prior art recharging stations inappropriate for use in certain locations, especially secure semi-public locations, such as the offices of a company. In an office that employs a lot of people, a recharging station for mobile electronic devices could be very useful. Use of the recharging station would be free. Accordingly, the owner of the office would want the recharging station to have the lowest operating overhead possible.

A need therefore exists for a system and method of providing a charging station for mobile electronic devices that can be used in a semi-secure environment and has a very small operating cost, wherein the recharging system inhibits theft without inhibiting rapid access to the mobile electronic device. This needs is met by the present invention as described and claimed below.

SUMMARY OF THE INVENTION

The present invention is a system and method for storing, charging, and monitoring one or more handheld electronic devices in a public or semi-public environment. The system and method utilize a cabinet structure. The cabinet structure defines a plurality of compartments that are sized to retain a variety of handheld electronic devices.

A power supply is provided that is supported by the cabinet structure. Cables are provided that lead from each of the compartments to the power supply. The cables are terminated in the compartments with a variety of connector heads. The connector heads are sized to engage different makes and models of handheld electronic devices.

At least one camera is supported by the cabinet structure. The camera is positioned to image any person who may approach the compartments in the cabinet and attempt to remove a handheld electronic device.

The system is operated by a user utilizing an interface and a systems controller. When a user places a handheld electronic device in a compartment and connects that device to the appropriate connector head, a power connection is made. The handheld electronic device is powered through that power connection. Furthermore, the controller assigns a unique access code to that connection. Should a person undue the connection without first entering the proper access code into said interface, then the camera is activated. Images are taken of the person attempting to take the handheld electronic device. Optional alarm indicators may also sound in order to draw attention to the unauthorized person. If the unauthorized person, does take a handheld electronic device, images of that person can later be viewed through the user interface.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention charging station can be embodied in many ways, only two embodiments of the invention are illustrated. These embodiments are selected in order to set forth two of the best modes contemplated for the invention. The illustrated embodiments, however, are merely exemplary and should not be considered a limitation when interpreting the scope of the appended claims.

Figure 1:
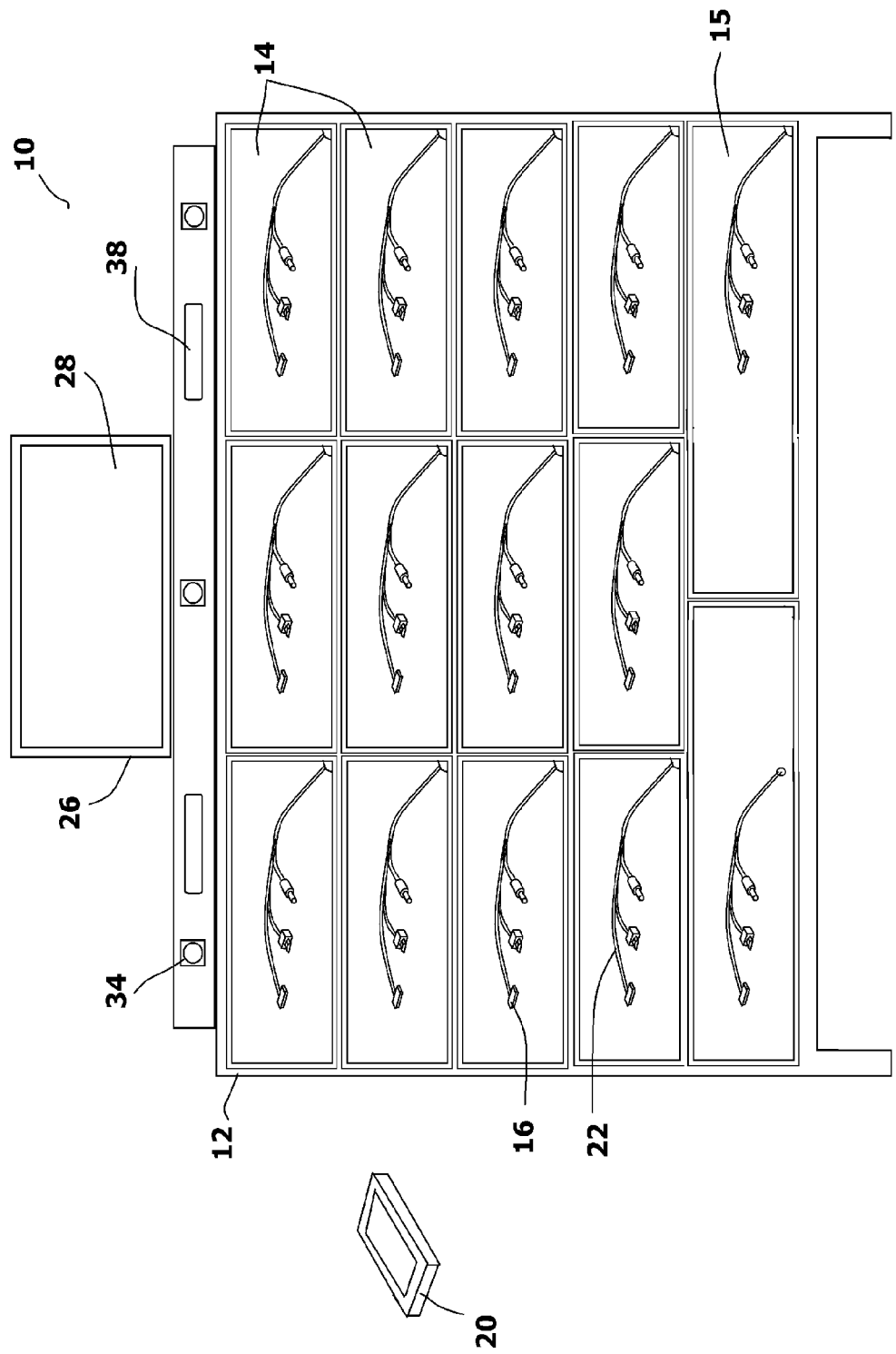
FIG. 1 is a front view of a first exemplary embodiment of a charging station in accordance with the present invention.
Figure 2:
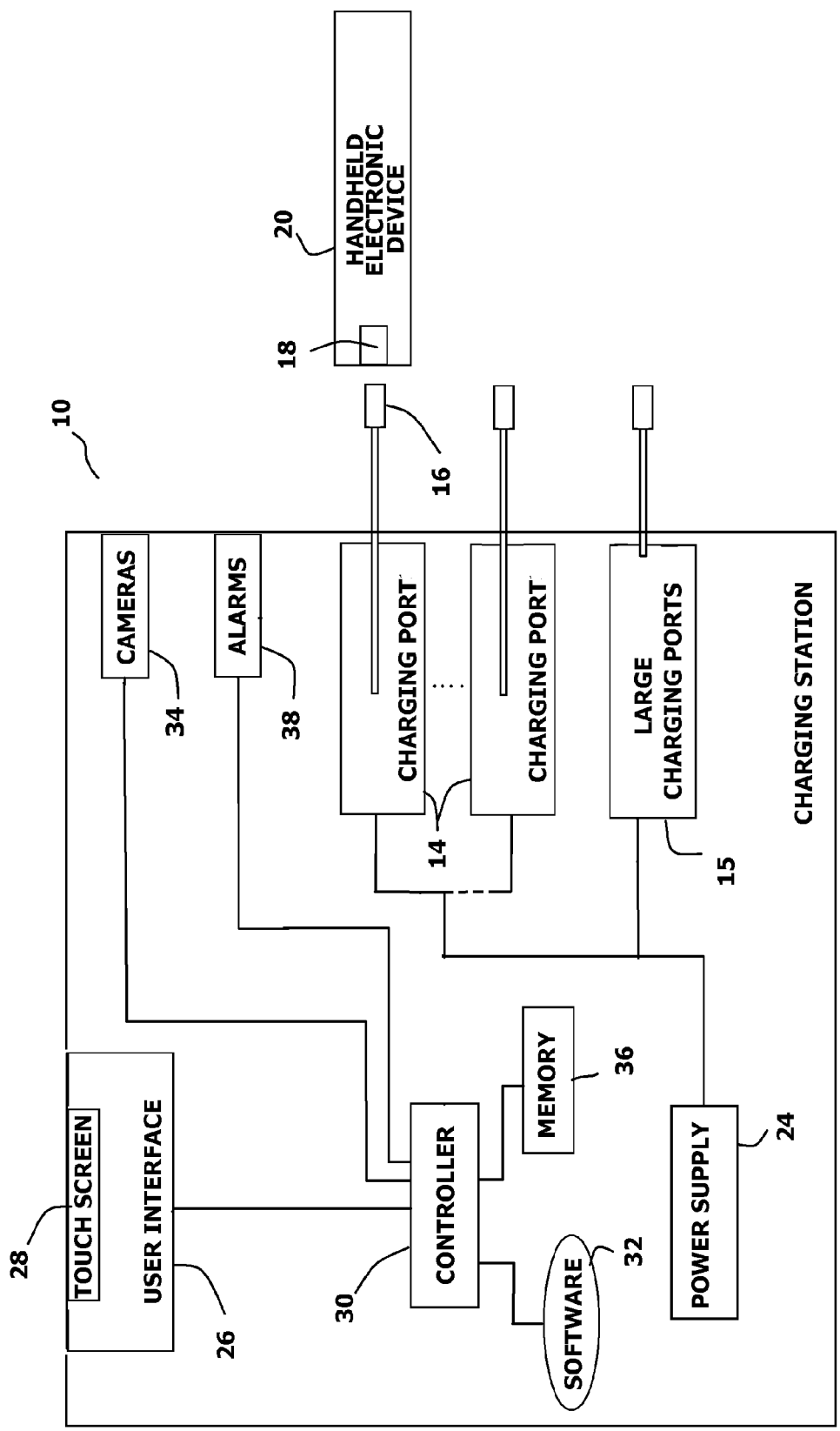
FIG. 2 is a schematic showing the primary components of the exemplary embodiment.

Referring to FIG. 1 in conjunction with FIG. 2, a charging station 10 is shown. The charging station 10 contains a cabinet structure 12 into which are set a plurality of charging ports 14. Each of the charging ports 14 is sized to retain a mobile electronic device 20 at least as large as a tablet computer. Optional larger charging ports 15 can be provided for mobile electronic devices as large as lap top computers. In this embodiment, each of the charging ports 14, 15 has an open front, so that the interior of each of the charging ports 14, 15 can be rapidly accessed.

Within each of the charging ports 14, 15 is contained at least one cable connector 16. Preferably, each of the charging ports 14, 15 contains multiple cable connectors 16. The different cable connectors 16 provided in each of the charging stations 10 are configured to engage the charging receptacles 18 for the most popular manufacturer's of mobile electronic devices, such as Apple®, Samsung®, LG® and the like. If only one cable connector 16 is provided in each of the charging ports 14, 15, it is preferred that the charging ports 14, 15 be varied and appropriately labeled, wherein some of the charging ports 14, 15 are for Apple® devices, some for Samsung® devices and the like.

Each of the cable connectors 16 are used to terminate power cables 22. The power cables 22 all interconnect to a power supply 24 that provides a DC recharging current through the various power cables 22 and to the cable connectors 16. It will therefore be understood that when a user places a mobile electronic device 20 into a charging port 14, 15 and connects that mobile electronic device 20 to a cable connector 16, then the mobile electronic device 20 begins to charge.

A user interface 26 is provided at the top of the cabinet structure 12. The user interface 26 preferably utilizes a touch screen 28. However, a keyboard and display screen can also be used. The user interface 26 is coupled to a controller 30. The controller 30 is a dedicated computing device that is capable of running custom application software 32 without having to be connected to any outside communications network.

When the charging station 10 is not in use, the touch screen 28 can be used to display ads and promotions. If the charging station 10 is in a host business, such as a coffee house, then the ads and promotions can be for the host business. This will promote use of the charging station 10 by host businesses. If the charging station is in a location, such as an office, then the touch screen 28 can display ads for goods and services of third parties. This will enable the charging station 10 to generate income through ad revenue. This will also promote use of the charging station 10 by host businesses.

The controller 30 is coupled to the power supply 24 and is able to selectively control the power supply 24. Also, the controller 30 is connected to one or more cameras 34 that are mounted to the charging station 10. The cameras 34 are directed out away from the cabinet structure 12 and are designed to view any person who may approach the charging ports 14, 15 from any direction. The images recorded by the cameras 34 may be static images and/or video images. The images are stored in a memory 36 that are accessible by the controller 30.

Figure 3:
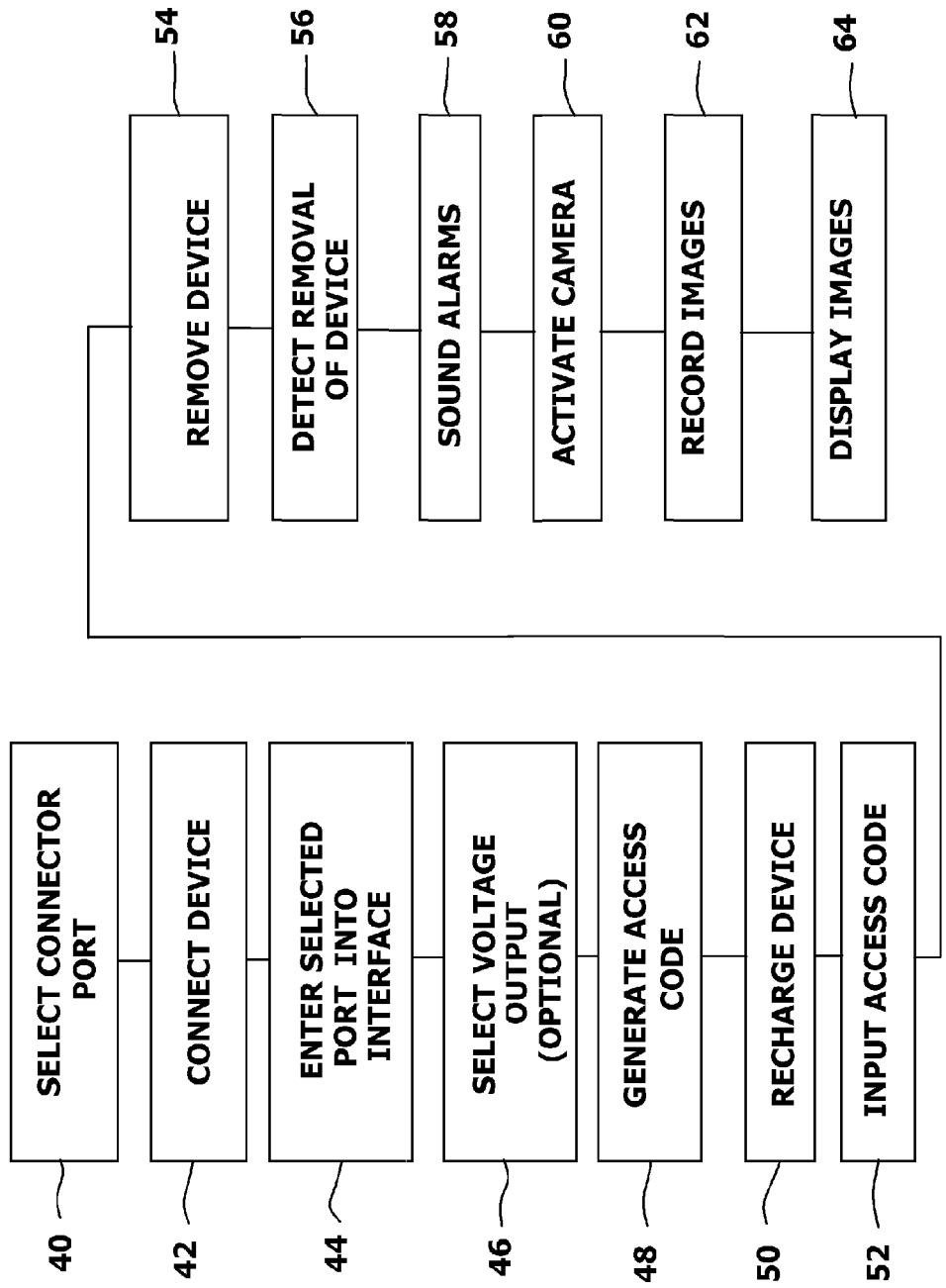
FIG. 3 is a flow diagram showing the method of operation for the charging station.

Referring now to FIG. 3 in conjunction with both FIG. 1 and FIG. 2, the method of operation for the charging station 10 is explained. To utilize the charging station 10, a user selects a charging port 14, 15 and connects a mobile electronic device 20 to the appropriate connector 16 of a power cable 22 within that charging port 14, 15. See Block 40 and Block 42. The user then inputs the selected charging port 14, 15 into the user interface 26. For example, if a user places a smart phone into the second charging port, that user would select charging port #2 when prompted at the user interface 26. See Block 44.

Once a charging port 14, 15 is selected, the controller causes the power supply 24 to power the connectors 16 within the selected port. See Block 46. Optionally, a user can use the interface 26 to vary the voltage output from predetermined default value. The default voltage is 9.6 volts. This voltage is proper for recharging most modern cell phones and tablet computers. However, if a person is attempting to recharge an exotic electronic device, the output voltage can be altered by a proper menu selection on the user interface 26.

Once a user selects a recharging port, the user is prompted with an access code. See Block 48. The access code is preferably a number. However, alphanumeric codes can also be used. Once a user is assigned his/her access code, the user can then leave his/her mobile electronic device 20 charging in the charging port 14, 15. See Block 50.

When a user wants to retrieve his/her mobile electronic device 20, a user approaches the charging station 10 and inputs his/her access code into the user interface 26. See Block 52. The user is then free to remove his/her mobile electronic device 20 from the charging port 14, 15 that was assigned to that access code. See Block 54.

Referring to FIG. 3 in conjunction with FIG. 1 and FIG. 2, it can be seen that if a person does not enter the access code and removes a mobile electronic device 20 from a charging port 14, 15, two alarm events occur. First, upon detecting that a mobile electronic device 20 has been disconnected from a connector 16, the controller 30 activates the alarms 38. See Block 56 and Block 58. The alarms 38 are preferably audible and visual in nature, so that the alarms 38 include an alarm siren as well as flashing lights. The activation of the alarms 38 would automatically direct people's attention to the charging station 10 and the person attempting to remove a mobile electronic device 20 from the charging station 10. Second, the controller 30 activates the cameras 34 and takes images of the person at the charging station 10. See Block 60. These images are stored in memory 36. See Block 62. These images can be recalled by any user who has the proper access code for the charging port 14, 15 from where the mobile electronic device 20 was removed. See Block 64.

If a user were to mistakenly remove his/her mobile electronic device 20 without first entering the proper access code, then the alarms 38 will sound. The alarms 38 can be immediately deactivated by entering the proper access code into the user interface 26. Otherwise, the alarms 38 will continue to sound and the cameras 34 record for a predetermined period of time, such as thirty seconds.

It will therefore be understood that if a person were to take a mobile electronic device from the charging station 20 that did not belong to that person, then the alarm 38 would sound and that person would be imaged in the act of theft. In a semi-secure location, such as an office, where only employees have access to the charging station 10, these deterrents are adequate to inhibit theft. This is because the thief could be quickly identified and would probably lose his/her job at the office.

The alarms 38 only sound and the cameras 34 only activate when a person disconnects a mobile electronic device 20 from a connector without first entering the proper access code. However, these alarm actions do not occur if a person merely removes a recharging mobile electronic device 20 from a charging port 14 without disconnecting the connector 16 of the power cable 22. The length of the various power cables 22 is designed to enable a user to maneuver a mobile electronic device 20 at least a foot in front of a charging port 14, 15 without disconnecting that mobile electronic device 20. As a consequence, if a user has to rapidly access their mobile electronic device 20 while it is recharging, it can be done so without activating the alarms 38.

Although the present invention does provide good security for use in semi-public areas, such as an office, the mere sounding of an alarm and activation of cameras would not work as well in public areas, such as coffee shops, where people cannot be identified by sight.

Figure 4:
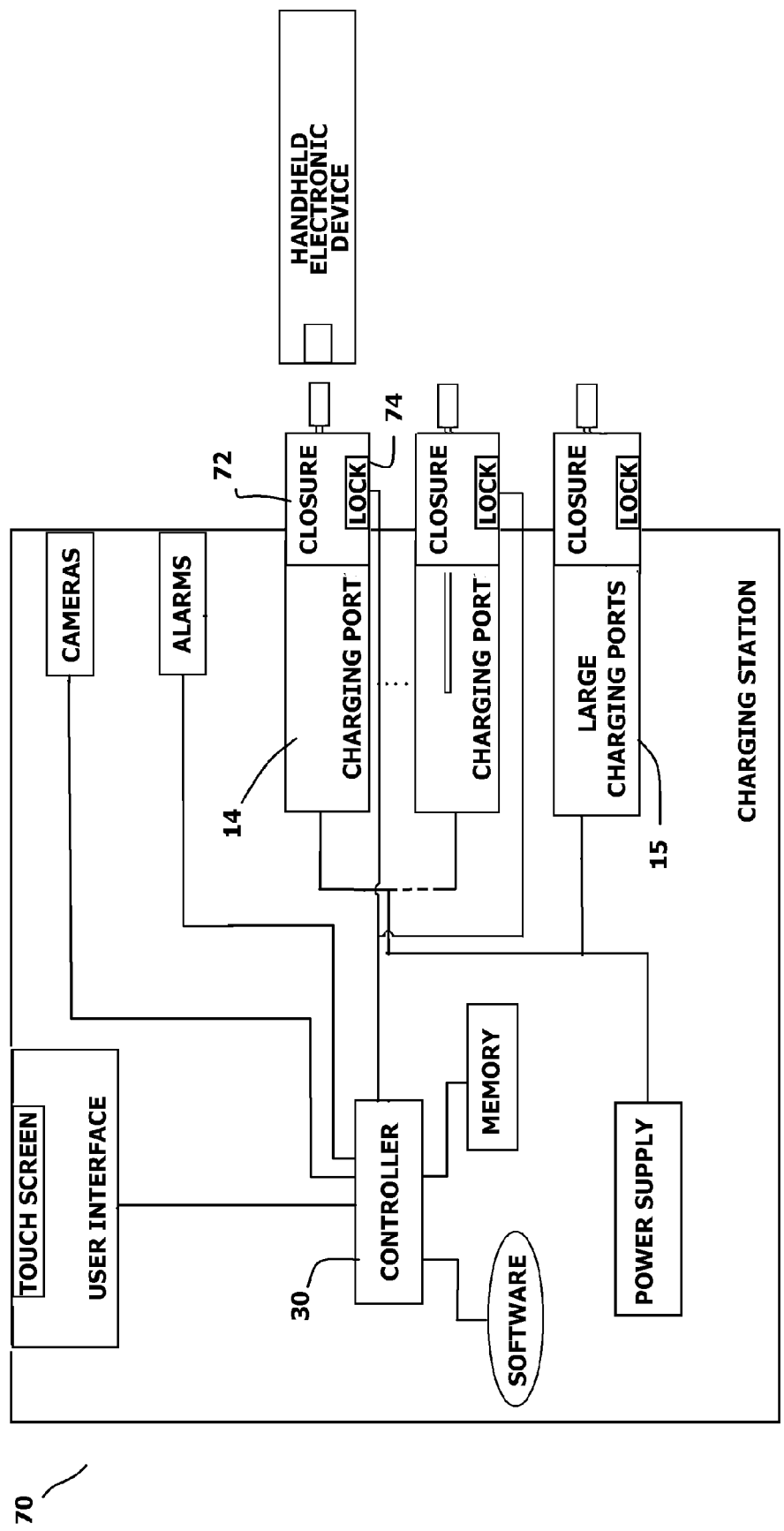
FIG. 4 is a schematic showing the primary components to a second exemplary embodiment of a charging station.

Referring to FIG. 4, a modified charging station 70 is shown for use in public areas. The modified charging station 70 contains the same components and operational features as have been previously described, wherein the same reference numbers are used to identify the same components. However, in the modified charging station 70, each of the charging ports 14, 15 contains a closure 72 that can be locked by an automated locking mechanism 74. The locking mechanism 74 is coupled to the controller 30. The controller 30 will only unlock the automated locking mechanism 74 to a particular charging port when the appropriate access code for that charging port is entered into the user interface 26.

It will be understood that the embodiments of FIG. 1 and FIG. 4 can be combined in part. Charging stations can be provided that contain both open charging ports and locking charging ports.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of storing, charging and monitoring a handheld electronic device, said method comprising the steps of:
   providing a cabinet structure that defines a plurality of compartments;
   providing a power supply that supplies electrical current, wherein said power supply is supported by said cabinet structure;
   providing cables that lead from each of said compartments to said power supply;
   providing at least one camera that is supported by said cabinet structure;
   providing an interface that is supported by said cabinet structure;
   providing a controller that is supported by said cabinet structure;
   creating a connection between a mobile electronic device to one of said cables in one of said compartments, wherein said controller generates a unique access code that is associated with said connection; and
   activating said at least one camera should a person open said connection without first entering said unique access code into said interface.

2. The method according to claim 1, further including the step of providing at least one alarm indicator that is supported by said cabinet structure, wherein said controller activates said at least one alarm indicator should a person open said connection without first entering said unique access code into said interface.

3. The method according to claim 1, further including the step of providing a memory, wherein said at least one camera records images when activated and stores said images in said memory.

4. The method according to claim 3, wherein said interface includes a display and said controller displays at least one of said images stored in said memory, after said at least one camera is activated, when said access code is input into said interface.

5. The method according to claim 1, wherein said step of providing a cabinet structure that defines a plurality of compartments, includes providing closures for each of said compartments with locking mechanisms that can be selectively operated by said controller.

6. The method according to claim 5, further including the step of opening said locking mechanism for one of said compartments when said access code is entered into said interface for said connection that is contained therein.

7. The method according to claim 1, wherein said step of providing a power supply that supplies electrical current includes providing a power supply having an output selectively controlled by said controller.

8. The method according to claim 1, further including the step of terminating said cables in each of said compartments with a variety of connectors, wherein each of said connectors is configured to engage a different model of a handheld electronic device.

9. An assembly for storing, charging and monitoring at least one handheld electronic device, said assembly comprising:
   a cabinet structure that defines a plurality of compartments;
   a power supply that supplies electrical current;
   cables that are connected to said power supply and lead into each of said plurality of compartments, wherein said cables terminate within said plurality of compartments with connectors;
   at least one camera supported by said cabinet structure;
   at least one alarm;
   a memory for retaining images recorded by said at least one camera;
   a controller that runs a software application, wherein said controller operates said at least one camera and said at least one alarm;
   an interface supported by said cabinet structure for exchanging data with said controller, wherein said controller identifies when a handheld electronic device is connected to one of said connectors in one of said plurality of compartments and allocates a unique access code thereto, and
   wherein said controller activates said at least one camera and said at least one alarm if the handheld electronic device is disconnected from one of said connectors without said access code being input into said interface.

10. The assembly according to claim 9, further including a memory, wherein said at least one camera records images when activated and stores said images in said memory.

11. The assembly according to claim 10, wherein said interface includes a display and said controller displays at least one of said images stored in said memory, after said at least one camera is activated, when said access code is input into said interface.

12. The assembly according to claim 10, wherein said controller opens said locking mechanism for one of said compartments when said access code is entered into said interface.

13. The assembly according to claim 9, further including closures for each of said plurality of compartments, wherein each of said closures includes a locking mechanism that can be selectively operated by said controller.

14. The method according to claim 9, wherein said power supply has an electrical output that is selectively controlled by said controller.

* * * * *